United States Patent [19]

Kondo et al.

[11] Patent Number: 5,081,535
[45] Date of Patent: Jan. 14, 1992

[54] EXPOSURE CONTROL APPARATUS FOR ELECTRONIC STILL CAMERA HAVING A THROUGH THE LENS LIGHT MEASURING SYSTEM

[75] Inventors: Shigeru Kondo; Akiro Aoki, both of Tokyo, Japan

[73] Assignee: Fuji Photo Film Co., Ltd., Kanagawa, Japan

[21] Appl. No.: 596,659

[22] Filed: Oct. 11, 1990

[30] Foreign Application Priority Data

Oct. 14, 1989 [JP] Japan ................................. 1-267774

[51] Int. Cl.$^5$ ............................................ H04M 5/238
[52] U.S. Cl. ................................. 358/228; 358/209; 358/225
[58] Field of Search .................. 358/228, 227, 213.13, 358/213.19, 909; 250/229, 237 R; 356/233; 354/230, 229, 270, 271.1, 448, 453, 446, 441, 444, 442

[56] References Cited

U.S. PATENT DOCUMENTS

| | | | |
|---|---|---|---|
| 2,429,971 | 11/1944 | Aiken | 354/254 |
| 3,482,497 | 3/1967 | Ernisse | 354/448 |
| 4,381,889 | 5/1983 | Sahara et al. | 354/41 |
| 4,571,629 | 2/1986 | Horio et al. | 358/225 |

Primary Examiner—James J. Groody
Assistant Examiner—Toan V. Ho
Attorney, Agent, or Firm—Sughrue, Mion, Zinn Macpeak & Seas

[57] ABSTRACT

In an electronic still camera, an aperture plate having a number of different apertures and shading portions is provided. When picking up an image, one of the apertures that is selected depending on a light measurement value is inserted in an exposure light path to start exposure of a solid state imaging device simultaneously with the start of a charge storage time thereof. After the charge storage time, the aperture plate is moved by a driving device to insert one of the shading portions in the exposure light path in place of the aperture so as to shade the solid state imaging device.

9 Claims, 3 Drawing Sheets

EXPOSURE CONTROL APPARATUS FOR ELECTRONIC STILL CAMERA HAVING A THROUGH THE LENS LIGHT MEASURING SYSTEM

BACKGROUND OF THE INVENTION

The present invention relates to an exposure control apparatus for an electronic still camera, especially a camera of a type having a TTL (through the lens) light measuring system.

In electronic still cameras, still video images formed on a solid state imaging device such as a CCD image sensor are photo-electrically converted into electric video signals, which are recorded on a still video floppy disc. Because a solid state imaging device generally has a narrow dynamic range, it is necessary to control the exposure precisely.

In general, the exposure of an electronic still camera is controlled by setting a shutter speed and an aperture size according to an automatic exposure control program. Though it is possible to use a mechanical shutter, it is inexpensive and preferable to use a sensor shutter which adjusts a charge storage time of the solid state imaging device. Furthermore, it is desirable to measure the subject brightness through a TTL light measuring system so as to control the exposure properly. Therefore, there are conventional still cameras which employ a TTL light measuring system and a sensor shutter.

As is known in the art, the solid state imaging device always is illuminated, and the charge storage phase and the read out phase of the solid state imaging device are repeated periodically so long as a power switch is turned on. Therefore, unnecessary light entering at a time other than an appropriate main charge storage time, that is, a necessary exposure time for picking up an image, may produce a noise charge in the charge storage portion or the charge transfer channel of the solid state imaging device. If such a noise charge leaks to the charge transfer channel, it will cause a smear noise in the produced image, lowering the quality of the image remarkably.

In order to reduce the effect of such noise charges, unnecessary charges are swept out of the solid state imaging device before the charge is stored. However, unnecessary light entering immediately after the charge storage time may still cause noise charges.

SUMMARY OF THE INVENTION

In view of the foregoing, one object of the present invention is to provide an exposure control apparatus for an electronic still camera having a TTL light measuring system and a sensor shutter, in which the effect of the smear noise is minimized.

To achieve the above and other objects, the present invention provides an aperture plate formed with a number of different apertures for limiting in stepwise fashion the amount of exposure light traveling through a taking lens toward a solid state imaging device, wherein portions adjacent to the respective apertures are formed as shading portions to shade the exposure opening completely. The aperture plate is driven by a driving device to place one of the shading portions in the exposure light path except for a predetermined charge storage time of the solid state imaging device.

According to the invention, the shading portion of the aperture plate closes the exposure opening as soon as a predetermined charge storage time has elapsed, that is, before the following charge transfer time. Therefore, the solid state imaging device will not receive unnecessary light after the charge storage time.

BRIEF DESCRIPTION OF THE DRAWINGS

Other objects and advantages of the invention will become apparent from the following detailed description when read in conjunction with the accompanying drawings, wherein.

DETAILED DESCRIPTION OF THE PREFERRED EMBODIMENT

Figure 1:
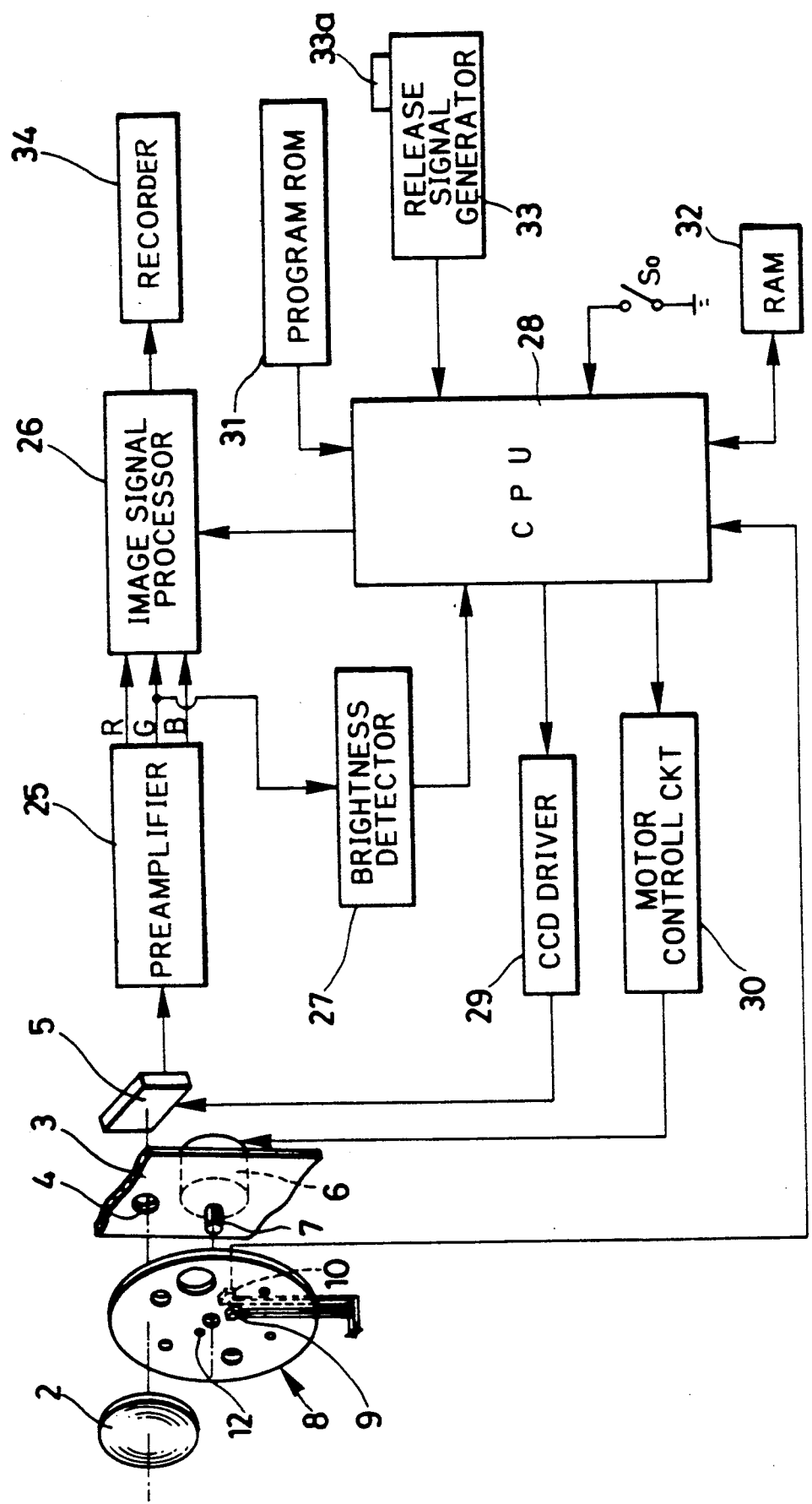
FIG. 1 is a block diagram of an electronic camera in which an exposure control apparatus according to the invention is incorporated.

FIG. 1 illustrates circuitry of an electronic still camera and an exposure control apparatus according to the invention. Behind a taking lens, there is disposed a light-tight plate 3 formed with an exposure opening 4. Light passing through the taking lens and the exposure opening 4 forms an optical image on a solid state imaging device such as a CCD image sensor 5, which then converts the image photo-electrically into electric signals.

Figure 2:
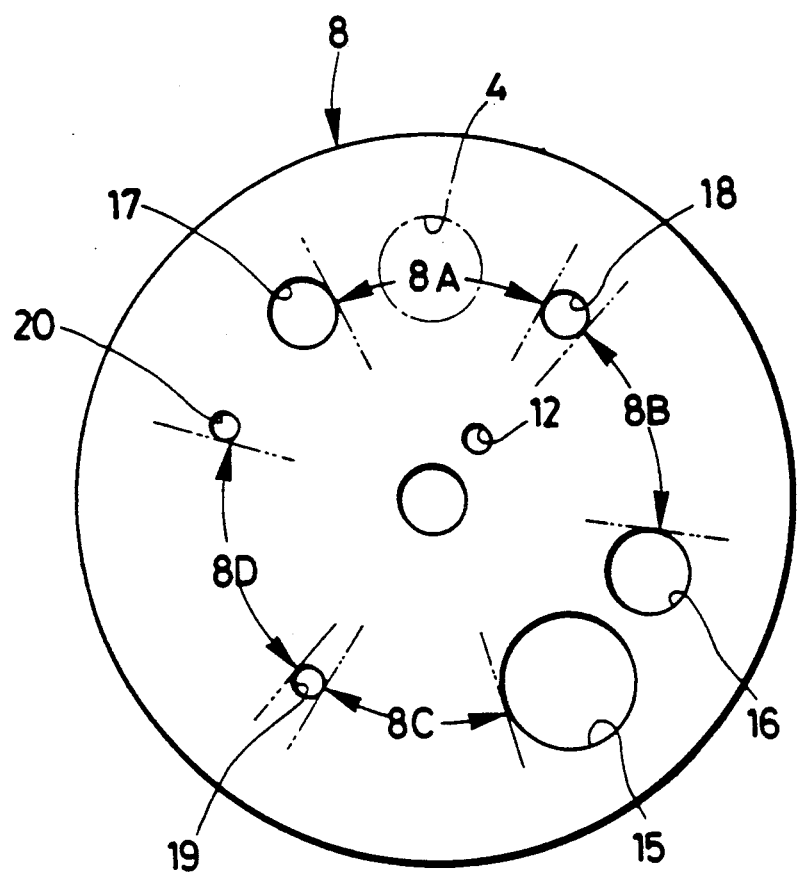
FIG. 2 is a front view of the exposure control apparatus of FIG. 1.

The light-tight plate 3 is mounted fixedly with a pulse motor 6 whose rotary shaft 7 is coupled to an aperture disc 8. As shown in FIG. 2, the aperture disc 8 is formed with a number of apertures of different sizes, e.g. six apertures 15 to 20 sized f 3.5, f 4.6, f 5.6, f 8, f 11 and f 16, respectively. An opening 12 is used to detect an initial position of the aperture disc 8 such that, when the opening 12 is positioned between a photosensor 9 and a LED 10 so that the photosensor detects light from the LED 10, then the aperture disc 8 is determined to be in the initial position. In this initial position, the exposure opening 4 is closed by a shading portion 8A of the aperture disc 8.

The aperture disc 8 is sectioned into 10 sections around the rotational axis of the disc. The sectioning lines are spaced 36 degrees apart from each other. The center of each aperture 15. 16. 17, 18 19, 20 is located on a sectional line spaced equally from the rotational axis of the disc. The center of each shading portion 8A, 8B, 8C, 8D also is located on one of the sectional lines, so that the shading portion 8A is positioned between the apertures 17 and 18, and the shading portion 8B is between the apertures 16 and 18, whereas the shading portion 8C is between the apertures 15 and 19, and the shading portion 8D is between the apertures 19 and 20. Because at least one of the shading portions is positioned adjacent to each aperture 15 to 20 in this way, it is possible to close the exposure opening 4 fully only by rotating the aperture disc 8 clockwise or counterclockwise 36 degrees, whichever aperture has been placed in front of the exposure opening 4.

The electric signals detected by the photoelectric conversion in the CCD image sensor 5 are transmitted serially to a preamplifier 25 which amplifies the signal components separately for each color and supplies them to an image signal processor 26, where the signals are processed into NTSC (National Television System Committee) video signals. The video signals are transmitted to a recorder 34 to be written onto a recording medium such as a magnetic floppy disc or an integrated circuit (IC) memory. A green color signal (G signal) from the preamplifier 25 also is transmitted to a brightness detector 27, which detects the subject brightness and converts it into digital data to be supplied to a CPU 28.

The CPU 28 is connected to a CCD driver 29 for driving the CCD image sensor 5, a motor control circuit 30, a program read-only memory (ROM) 31 and a random access memory (RAM) 32. The program ROM 31 stores a program for executing light measurement as well as exposure in a predetermined sequence. The RAM 32 temporarily stores various data necessary for executing the above program.

The CPU 26 receives a pulse signal from the photosensor 9 when the aperture disc 8 is in its initial position. The CPU 26 further receives a light measurement start signal from a release signal generator 33 upon a half-depression of a shutter release button 33a, whereas it receives a release signal from the release signal generator 33 upon a full-depression of the shutter release button 33a. So is a power switch.

Figure 3:
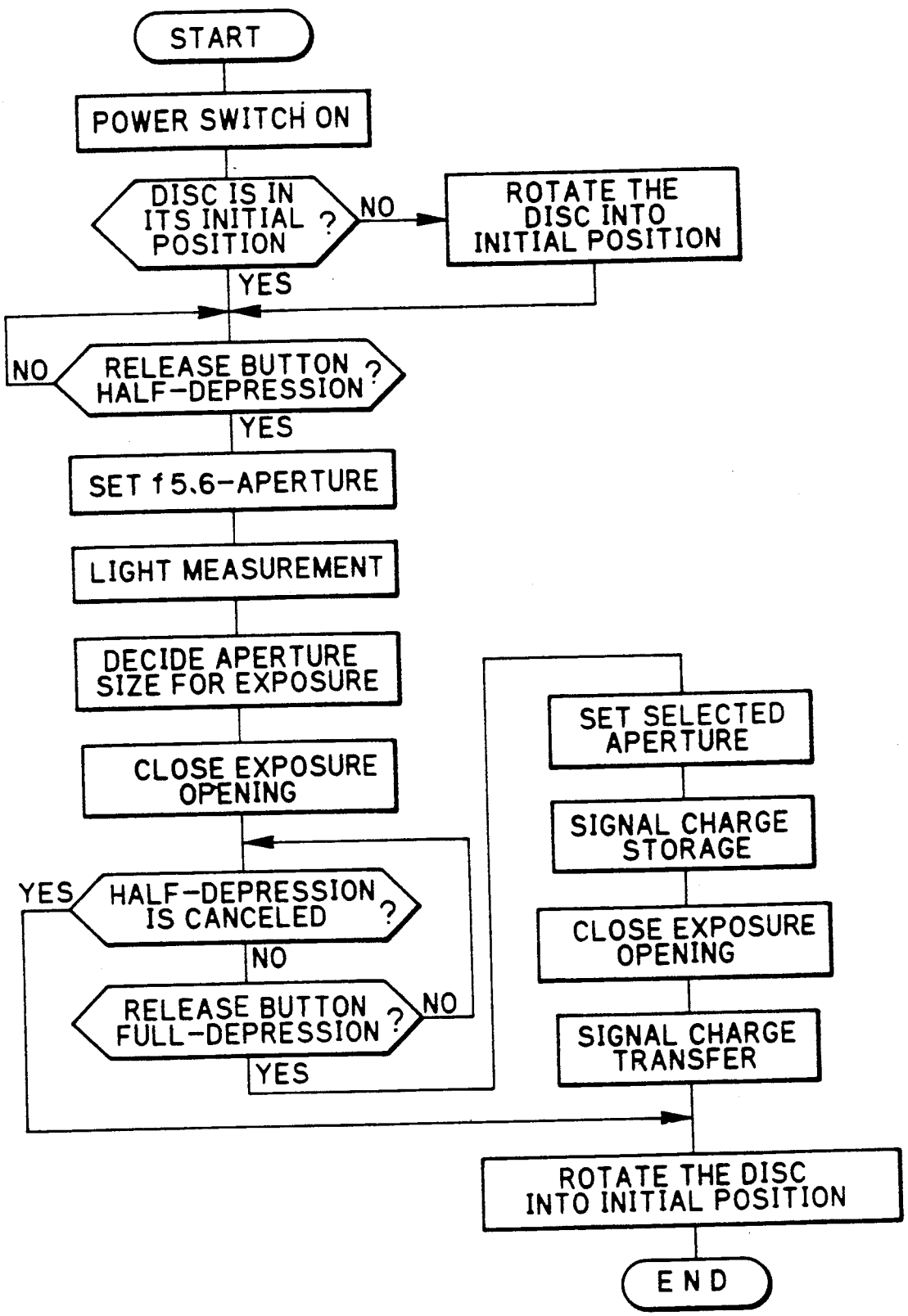
FIG. 3 is a flow chart for explaining the sequence of processing in the camera of FIG. 1.

Next, the operation of the above electronic still camera will be described with reference to the flow chart of FIG. 3.

Upon turning the power switch So on, first it is determined, by checking the pulse signal from the photosensor 9, whether the aperture disc 8 is in the initial position. If not, the pulse motor 6 is driven to move the aperture disc 8 into the initial position. In the initial position of the disc 8, the exposure opening 4 is completely closed by the shading portion 8A, and thus the CCD image sensor 5 is shielded from unnecessary ambient light.

When the light measurement start signal is inputted to the CPU in response to a half-depression of the release button 33a, the CPU 28 outputs a drive signal to the motor control circuit 30, which then drives the pulse motor 6 to rotate the aperture disc 8 clockwise 36 degrees so as to place the f 5.6 aperture 17 in front of the exposure opening 4 for a constant time interval that is a charge storage time for light measurement. Using the f 5.6 aperture 17 for light measurement makes it possible to measure brightness in a wide range from a low to a high brightness range even through the CCD image sensor 5 does not have a wide dynamic range.

The G signals detected for each frame through the CCD image sensor 5 are integrated in the brightness detector 27. The integrated value is inputted as average brightness data to the CPU 28. The CPU 28 calculates the average brightness of a subject on the basis of the average brightness data and aperture data of the f 5.6 sized aperture, and refers to a program for exposure stored in the program ROM 31 to decide an aperture size as well as an exposure time, that is, a main charge storage time of the CCD image sensor 5, in accordance with the average brightness.

If, in this way, an f 4.6 aperture size is selected, the CPU 28 drives the pulse motor 6 through the motor control circuit 30 so as to rotate the aperture disc 8 into a standby position in which the shading portion 8B adjoining the f 4.6 sized aperture is placed in front of the exposure opening 4. If the half-depression of the shutter release button 33a is cancelled in this condition, the aperture disc 8 is returned back to the initial position.

Upon a full-depression of the shutter release button 33a, the aperture disc is rotated counterclockwise 36 degrees from the standby position as to place the f 4.6 sized aperture 16 in front of the exposure opening 4.

Then, the CPU 28 drives the CCD driver 29 to sweep out the CCD image sensor 5 at a high speed so as to eliminate noise charges in the charge transfer channel of the CCD image sensor 5. Thereafter, the main charge storage time for picking up the image of the subject is started, the interval of which is decided in accordance with the exposure program as described above.

The CCD driver 29 outputs a shift pulse to the CCD image sensor 5 at the end of the charge storage time, so that the signal charges in the charge storage portion are shifted at once to the charge transfer channel in the CCD image sensor 5. In synchronism with this shift pulse, the CPU 28 drives the pulse motor 6 through the motor control circuit 30 to rotate the aperture disc 8 and position the shading portion 8B in front of the exposure opening 4. The signal charges shifted into the charge transfer channel are transferred serially to the image signal processor though the preamplifier 25, and then the recorder 34 records the signals onto the recording medium.

Because at least one of the shading portions 8A to 8D is disposed adjacent each aperture 15, 16, 17, 18, 19, 20, it is possible to shade the CCD image sensor 5 immediately after the charge storage time only by rotating the aperture disc by at most 36 degrees in one direction. This prevents the smear noises that may be caused by unnecessary charge leaking into the charge transfer channel during the charge transfer process in the CCD image sensor 5, so that the signal-to-noise (S/N) ratio of the signal charge is improved.

Furthermore, there is no need to return the aperture disc back to its initial position immediately after the imaging, and thus no aperture will pass by the exposure opening 4 during the charge transfer time, irrespective of which aperture has been positioned in front of the exposure opening 4. If, for instance, a small aperture has been used to expose the CCD image sensor 5 because of a very bright subject, the CCD image sensor 5 would not be illuminated thereafter by the intense light from the subject through a larger aperture until the charge transfer time has elapsed.

While the invention has been described in detail above with reference to a preferred embodiment, various modifications within the scope and spirit of the invention will be apparent to people of working skill in this technological field. Thus, the invention should be considered as limited only by the scope of the appended claims. For example, it is possible to adopt a slidable plate having various apertures and shading portions. The shading portion that closes the exposure opening at the initial position also may be used to shade the opening immediately after the charge storage time.

What is claimed is:

1. An exposure control apparatus for an electronic still camera, said apparatus comprising:
    a solid state imaging device for converting an optical image of a subject into electric image signals;
    means for controlling charge storage time of said solid state imaging device so as to adjust an exposure time of said camera;
    an aperture plate, having a number of apertures for limiting the amount of exposure light, and at least a shading portion for shading said solid state imaging device from light, said apertures being different in size from each other, said aperture plate further including an opening for detecting an initial position of said aperture plate; and driving means for driving said aperture plate to position one of said apertures in an exposure light path toward said solid state imaging device for a predetermined charge storage time, and to place said shading portion in said exposure light path after said charge storage time.

2. An exposure control apparatus as defined in claim 1, wherein said shading portion is disposed on at least one side of each of said apertures.

3. An exposure control apparatus as defined in claim 1, wherein one of said shading portions is inserted in said exposure light path when said aperture plate is in its initial position.

4. An exposure control apparatus as defined in claim 1, further comprising a photosensor and an LED disposed such that, when said opening is positioned between said photosensor and said LED, said photosensor detects light from said LED and said aperture plate is determined to be in the initial position.

5. An exposure control apparatus for an electronic still camera, said apparatus comprising:
a solid state imaging device for converting an optical image of a subject into electric image signals;
means for controlling charge storage time of said solid state imaging device so as to adjust an exposure time of said camera;
an aperture plate, having a number of apertures for limiting the amount of exposure light, and at least a shading portion for shading said solid state imaging device from light, said apertures being different in size from each other; and
driving means for driving said aperture plate to position one of said apertures in an exposure light path toward said solid state imaging device for a predetermined charge storage time, and to place said shading portion in said exposure light path after said charge storage time,
wherein said shading portion is disposed on at least one side of each of said apertures, and further wherein, upon a half-depression of a shutter release button, said driving means drives said aperture plate to place a first predetermined one of said apertures in said exposure light path for a certain time interval for light measurement and thereafter to place said shading portion in said exposure light path, and, upon a full-depression of said shutter release button, drives said aperture plate to place a second predetermined one of said apertures in said exposure light path for a charge storage time in accordance with the light measurement value.

6. An exposure control apparatus as defined in claim 5, wherein said aperture plate comprises a rotatable disc having said apertures and shading portions around its rotational axis.

7. An exposure control apparatus as defined in claim 5, wherein said driving means includes a pulse motor.

8. An exposure control apparatus as defined in claim 7, wherein said pulse motor is driven in synchronism with pulses supplied to said solid state imaging device.

9. An exposure control apparatus as defined in claim 5, wherein said first and second predetermined apertures are different from each other.

* * * * *